(12) United States Patent
Koskela et al.

(10) Patent No.: US 11,445,425 B2
(45) Date of Patent: Sep. 13, 2022

(54) BEAM FAILURE RECOVERY MECHANISM

(71) Applicant: Nokia Technologies Oy, Espoo (FI)

(72) Inventors: Timo Koskela, Oulu (FI); Samuli Turtinen, Ii (FI); Chunli Wu, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 17/171,523

(22) Filed: Feb. 9, 2021

(65) Prior Publication Data
US 2021/0266810 A1 Aug. 26, 2021

(30) Foreign Application Priority Data
Feb. 21, 2020 (CN) ................ PCT/CN2020/076277

(51) Int. Cl.
*H04W 36/30* (2009.01)
*H04B 7/06* (2006.01)
(Continued)

(52) U.S. Cl.
CPC ........ *H04W 36/305* (2018.08); *H04B 7/0639* (2013.01); *H04B 7/0695* (2013.01);
(Continued)

(58) Field of Classification Search
CPC ... H04W 36/305; H04W 36/06; H04W 36/10; H04W 74/0833; H04W 24/04; H04W 72/046; H04B 7/0639; H04B 7/0695
See application file for complete search history.

(56) References Cited

U.S. PATENT DOCUMENTS

2019/0052343 A1 2/2019 Li et al.
2019/0313264 A1 10/2019 Lin
(Continued)

FOREIGN PATENT DOCUMENTS

CN 110324908 A 10/2019
CN 110504998 A 11/2019
(Continued)

OTHER PUBLICATIONS

Extended European Search Report received for corresponding European Patent Application No. 21155355.7, dated Jul. 20, 2021, 9 pages.
(Continued)

*Primary Examiner* — Ivan O Latorre
(74) *Attorney, Agent, or Firm* — Harrington & Smith

(57) ABSTRACT

Example embodiments of the present disclosure relate to beam failure recovery mechanism. According to embodiments of the present disclosure, there are provided an improved solution for reporting candidate beams in serving cells. If a beam failure occurs in a serving cell, the first device determines a candidate beam for beam failure recovery from a plurality of beams in the serving cell based on link qualities of the plurality of beams. The first device also determines a resource configuration for a random access for the beam failure recovery for the first device or a resource to be used for the random access, The first device further generates an indication for indicating a characteristic of the candidate beam or a characteristic of a beam for performing the random access, based on at least one of the determined resource configuration or the determined resource. The first device also transmits an identity of the candidate beam and the indication to a second device. The second device performs the beam failure recovery based on the candidate beam and the characteristic of the candidate beam.

12 Claims, 7 Drawing Sheets

(51) Int. Cl.
*H04W 36/06* (2009.01)
*H04W 36/10* (2009.01)
*H04W 74/08* (2009.01)

(52) U.S. Cl.
CPC .......... *H04W 36/06* (2013.01); *H04W 36/10* (2013.01); *H04W 74/0833* (2013.01)

(56) References Cited

U.S. PATENT DOCUMENTS

| | | | |
|---|---|---|---|
| 2020/0137821 A1* | 4/2020 | Cirik | H04B 7/063 |
| 2020/0145280 A1* | 5/2020 | Cirik | H04B 7/0695 |
| 2020/0374960 A1* | 11/2020 | Deenoo | H04W 72/1284 |
| 2021/0007151 A1* | 1/2021 | You | H04L 1/1812 |
| 2021/0013951 A1* | 1/2021 | Chen | H04B 7/0695 |
| 2021/0044342 A1* | 2/2021 | He | H04L 5/0051 |
| 2021/0068162 A1* | 3/2021 | Agiwal | H04L 5/0023 |
| 2021/0105058 A1* | 4/2021 | Lin | H04L 1/1614 |
| 2021/0168858 A1* | 6/2021 | Liu | H04W 72/042 |
| 2021/0175955 A1* | 6/2021 | Kung | H04W 80/02 |
| 2021/0218458 A1* | 7/2021 | Kung | H04W 76/27 |

FOREIGN PATENT DOCUMENTS

| | | | |
|---|---|---|---|
| EP | 3609225 A1 | 2/2020 | |
| WO | 2019/029344 A1 | 2/2019 | |
| WO | 2019/138284 A1 | 7/2019 | |
| WO | 2019/192713 A1 | 10/2019 | |
| WO | 2020/061955 A1 | 4/2020 | |
| WO | WO-2021034672 A1 * | 2/2021 | .......... H04B 17/309 |

OTHER PUBLICATIONS

"The remaining issues on Beam Failure Recovery on SpCell and Scell", 3GPP TSG-RAN WG2 e-Meeting #109, R2-2001509, Agenda item: 6.16.4, ZTE, Feb. 14, 2020, 11 pages.

"3rd Generation Partnership Project;Technical Specification Group Radio Access Network; NR; Medium Access Control (MAC) protocol specification (Release 15)", 3GPP TS 38.321, V15.8.0, Dec. 2019, pp. 1-78.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

International Search Report and Written Opinion received for corresponding Patent Cooperation Treaty Application No. PCT/CN2020/076277, dated Nov. 24, 2020, 9 pages.

"Remaining issues of SCell BFR", 3GPP TSG-RAN WG2 Meeting#109, R2-2000226, Agenda: 6.16.4, Samsung, Feb. 24-28, 2020, 3 pages.

"Further Discussion on RRM Requirement for SCell Beam Failure Recovery", 3GPP TSG-RAN WG4 Meeting #93, R4-1913324, Agenda: 9.11.2.2, Samsung, Nov. 18-22, 2019, pp. 1-8.

* cited by examiner

310 ↘

| 3140-7 | 3140-6 | 3140-5 | 3140-4 | 3140-3 | 3140-2 | 3140-1 | 3120-1 |
|---|---|---|---|---|---|---|---|
| 3110 | 3120-2 | 3130 ||||||

| 3240-7 | 3240-6 | 3240-5 | 3240-4 | 3240-3 | 3240-2 | 3240-1 | 3220-1 |
|---|---|---|---|---|---|---|---|
| 3240-15 | 3240-14 | 3240-13 | 3240-12 | 3240-11 | 3240-10 | 3240-9 | 3240-8 |
| 3240-23 | 3240-22 | 3240-21 | 3240-20 | 3240-19 | 3240-18 | 3240-17 | 3240-16 |
| 3240-31 | 3240-30 | 3240-29 | 3240-28 | 3240-27 | 3240-26 | 3240-25 | 3240-24 |
| 3210 | 3220-2 | 3230 ||||||

Fig. 3B

BEAM FAILURE RECOVERY MECHANISM

RELATED APPLICATION

This application claims priority from PCT Application No. PCT/CN2020/076277, filed on Feb. 21, 2020, which is hereby incorporated in its entirety.

FIELD

Embodiments of the present disclosure generally relate to the field of telecommunication and in particular, to methods, devices, apparatuses and computer readable storage medium for beam failure recovery mechanism.

BACKGROUND

With development of communication systems, more and more technologies have been proposed. For example, new radio access system, which is also called NR system or NR network, is being developed. A carrier aggregation (CA) technology to increase the system bandwidth may be supported in the NR system. When CA is used, there may be a number of serving cells for a terminal device. Generally, a primary cell (PCell) and at least one secondary cell (SCell) may be provided.

In addition, to reduce interference and/or increase resource efficiency, the terminal device may be served via one or more beams. A beam failure may occur when a quality of at least one beam of a serving cell falls below a predefined threshold. When all or part of beams serving the terminal device has failed, a beam failure recovery procedure is needed to recover from the beam failure.

SUMMARY

In general, example embodiments of the present disclosure provide a solution for beam failure recovery mechanism. Embodiments that do not fall under the scope of the claims are to be interpreted as examples useful for understanding the disclosure.

In a first aspect, there is provided a first device. The first deice comprises at least one processor; and at least one memory including computer program codes; the at least one memory and the computer program codes are configured to, with the at least one processor, cause the first device to in accordance with a determination that a beam failure occurs in a serving cell, determine a candidate beam for beam failure recovery from a plurality of beams in the serving cell based on link qualities of the plurality of beams; determine a resource configuration for a random access for the beam failure recovery for the first device or a resource to be used for the random access; generate an indication for indicating a characteristic of the selected candidate beam or a characteristic of a beam for performing the random access, based on at least one of the determined resource configuration or the determined resource; and transmit an identity of the candidate beam and the indication to a second device.

In a second aspect, there is provided a second device. The second deice comprises at least one processor; and at least one memory including computer program codes; the at least one memory and the computer program codes are configured to, with the at least one processor, cause the second device to receive, from a first device, an identity of a candidate beam for beam failure recovery and an indication for indicating a characteristic of the candidate beam or a beam for performing a random access for beam failure recovery; determine the candidate beam based on the received identity; determine the characteristic of the candidate beam or the beam for performing the random access, based on the received indication and at least one of a resource configuration for the random access or a resource used for performing the random access; and perform the beam failure recovery based on the candidate beam and the characteristic.

In a third aspect, there is provided a method. The method comprises in accordance with a determination that a beam failure occurs in a serving cell, determining a candidate beam for beam failure recovery from a plurality of beams in the serving cell based on link qualities of the plurality of beams; determining a resource configuration for a random access for the beam failure recovery for the first device or a resource to be used for the random access; generating an indication for indicating a characteristic of the selected candidate beam or a characteristic of a beam for performing the random access, based on at least one of the determined resource configuration or the determined resource; and transmitting an identity of the candidate beam and the indication to a second device.

In a fourth aspect, there is provided a method. The method comprises receiving, from a first device, an identity of a candidate beam for beam failure recovery and an indication for indicating a characteristic of the candidate beam or a beam for performing a random access for beam failure recovery; determining the candidate beam based on the received identity; determining the characteristic of the candidate beam or the beam for performing the random access, based on the received indication and at least one of a resource configuration for the random access or a resource used for performing the random access; and performing the beam failure recovery based on the candidate beam and the characteristic.

In a fifth aspect, there is provided a first apparatus. The first apparatus comprises means for in accordance with a determination that a beam failure occurs in a serving cell, determining a candidate beam for beam failure recovery from a plurality of beams in the serving cell based on link qualities of the plurality of beams; determining a resource configuration for a random access for the beam failure recovery for the first device or a resource to be used for the random access; generating an indication for indicating a characteristic of the selected candidate beam or a characteristic of a beam for performing the random access, based on at least one of the determined resource configuration or the determined resource; and transmitting an identity of the candidate beam and the indication to a second apparatus.

In a sixth aspect, there is provided a second apparatus. The second apparatus comprises means for receiving, from a first apparatus, an identity of a candidate beam for beam failure recovery and an indication for indicating a characteristic of the candidate beam or a beam for performing a random access for beam failure recovery; determining the candidate beam based on the received identity; determining the characteristic of the candidate beam or the beam for performing the random access, based on the received indication and at least one of a resource configuration for the random access or a resource used for performing the random access; and performing the beam failure recovery based on the candidate beam and the characteristic of the candidate beam.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIGS. 3A and 3B illustrate block diagrams of medium control access (MAC) control element (CE) according to some example embodiments of the present disclosure, respectively;

Throughout the drawings, the same or similar reference numerals represent the same or similar element.

DETAILED DESCRIPTION

Figure 1:
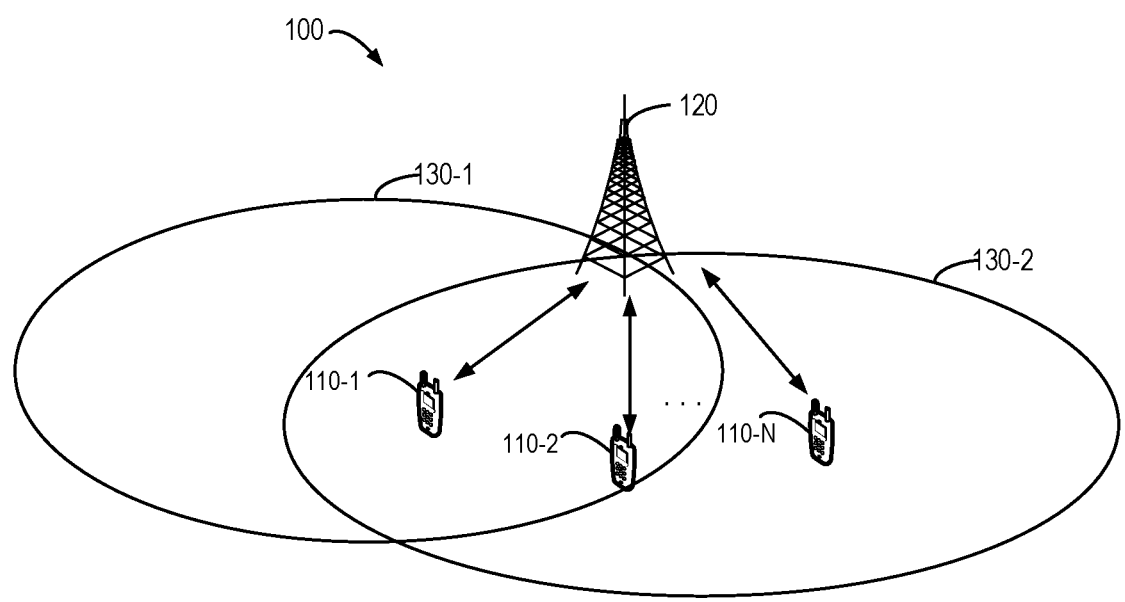
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), a portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, when all or part of beams serving the terminal device has failed, a beam failure recovery procedure is needed to recover from the beam failure. The terminal device may perform BFR using a random access procedure. For example, the preamble used by the terminal device in the random access procedure may indicate a candidate beam for the beam failure recovery.

A terminal device may perform BFR either using contention free random access (CFRA) or contention based random access (CBRA). The former is also called CFRA BFR, while the latter is called CBRA BFR. In CFRA BFR, the terminal device is provided with one or more dedicated RA preamble resources that correspond to a specific downlink reference signal (RS). The specific downlink reference signal which the CFRA is associated may be referred to as a new candidate beam. With the CFRA BFR, the terminal device can indicate to a network that a beam failure has been declared and the terminal device has initiated a recovery procedure and selected a new candidate beam. In some cases, the beams configured for CFRA may not be the strongest beam for the terminal device, i.e., a stronger beam not associated with the CFRA may be available, and then in such cases, it may be beneficial if the terminal device could indicate the stronger beam to the network.

When performing BFR using CBRA, the terminal device may select a preamble with corresponding beam quality (in terms of RSRP, SINR or the like) above a threshold and if no beam above threshold UE may select any beam associate with CBRA resources. Therefore, with CBRA based BFR, UE does not indicate a new candidate beam using the transmitted preamble to the network device. As a result, the network device may not be able to identify a reason for a CBRA from the terminal device. For example, the network device is unaware of whether the CBRA was triggered for BFR or for a scheduling request (SR) or any other reason. This makes it hard for the network to perform a proper operation in response to the received CBRA preamble. For the CBRA based BFR, the network device should reconfigure a physical downlink control channel (PDCCH) and a physical uplink control channel (PUCCH); while for the CBRA based SR, the terminal device simply requests a resource and thus no link reconfiguration is needed or scheduling request reconfiguration is needed.

Moreover, for BFR in a secondary cell (SCell), which is also called SCell BFR, the terminal device may transmit to a network device a medium access control (MAC) control element (CE) to indicate the BFR. For example, the MAC CE may indicate a failed beam and a candidate beam for recovery. For example, the terminal device may transmit a MAC CE that indicates network the failed SCell index. The MAC CE may also comprise an indication to indicate if a suitable candidate beam has been detected and an index of the candidate beam in the candidate beam list if available. Transmission of the MAC CE may be preceded by a transmission of a dedicated SR signal that indicates a beam failure event. Alternatively, the MAC CE may also be multiplexed to any uplink grant.

When a beam failure occurs in a primary cell (PCell) or a primary secondary cell (PSCell), the terminal device may include an indication of the beam failure, for example, into message 3 (also referred to as Msg. 3), although now SCells could be in failure as well.

The MAC CE for BFR may include a bitmap, each bit of which indicates beam failure detection in a cell. Each field in the bitmap of the MAC CE may also have a corresponding additional 8-bit sub-field. The additional 8-bit sub-field may indicate whether a suitable candidate RS, which may be referred to as a candidate beam, is available, and an index of the candidate beam if available. In some embodiments, if a candidate beam with a link quality above a specified threshold is unavailable, the terminal device may report the PCell or the PSCell that no candidate beam is available, and the candidate RS index field is not encoded or does not present in this case.

The term "special cell (SpCell)" used hereinafter refers to the types of cells comprising the PCell and PSCell. When beam failure occurs in a special cell, for example, the PCell or PSCell, if information indicating "no candidate beam available" is included in a BFR MAC CE, it may be problematic for the network device to perform the BFR. Since the PCell or PSCell is used as reference for Radio Link Monitoring (RLM) and other main control point for the terminal device, it would be crucial for the network device to know if the BFR is possible.

FIG. 1 illustrates a schematic diagram of a communication environment 100 in which embodiments of the present disclosure can be implemented. The communication environment 100, which is a part of a communication network, comprises a device 110-1, a device 110-2, . . . , a device 110-N, which can be collectively referred to as "first device (s) 110." The communication environment 100 further comprises a second device 120 that can communicate with the first device(s) 110. The first devices 110 are associated with and covered by cells (for example, shown as cells 130-1 and 130-2) managed by the second device 120.

As shown in FIG. 1, the cell 130-1 is the serving cell of the first device 110-1. The communication environment 100 may comprise any suitable number of devices and cells. In the communication environment 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL). The second device 120 and the first device 110 are interchangeable.

It is to be understood that the number of first devices and cells and their connections shown in FIG. 1 is given for the purpose of illustration without suggesting any limitations. The environment 100 may include any suitable number of devices and networks adapted for implementing embodiments of the present disclosure.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

According to embodiments of the present disclosure, there are provided a solution for reporting a candidate beam in serving cells. In an embodiment, when the first device 110-1 detects a beam failure in a serving cell, the first device 110-1 determines a candidate beam for BFR based on beam qualities. The first device 110-1 transmits information comprising the index of the candidate beam and an indication indicating a characteristic of the candidate beam to the second device 120. In this way, the second device 120 may be aware of the candidate beam and whether the candidate beam is actually the preferred beam, or whether a stronger beam is available. Therefore, such embodiments enable the second device 120 to use a beam with a better link quality for the BFR. Further, in some embodiments, information from the first device 110-1 may make the second device 120 aware of whether the indicated candidate beam or a beam used for random access for BFR from the first device 110-1 is above or below the configured threshold. As a result, the second device is able to make proper decisions on a configuration for the first device within the given cell.

Figure 2:
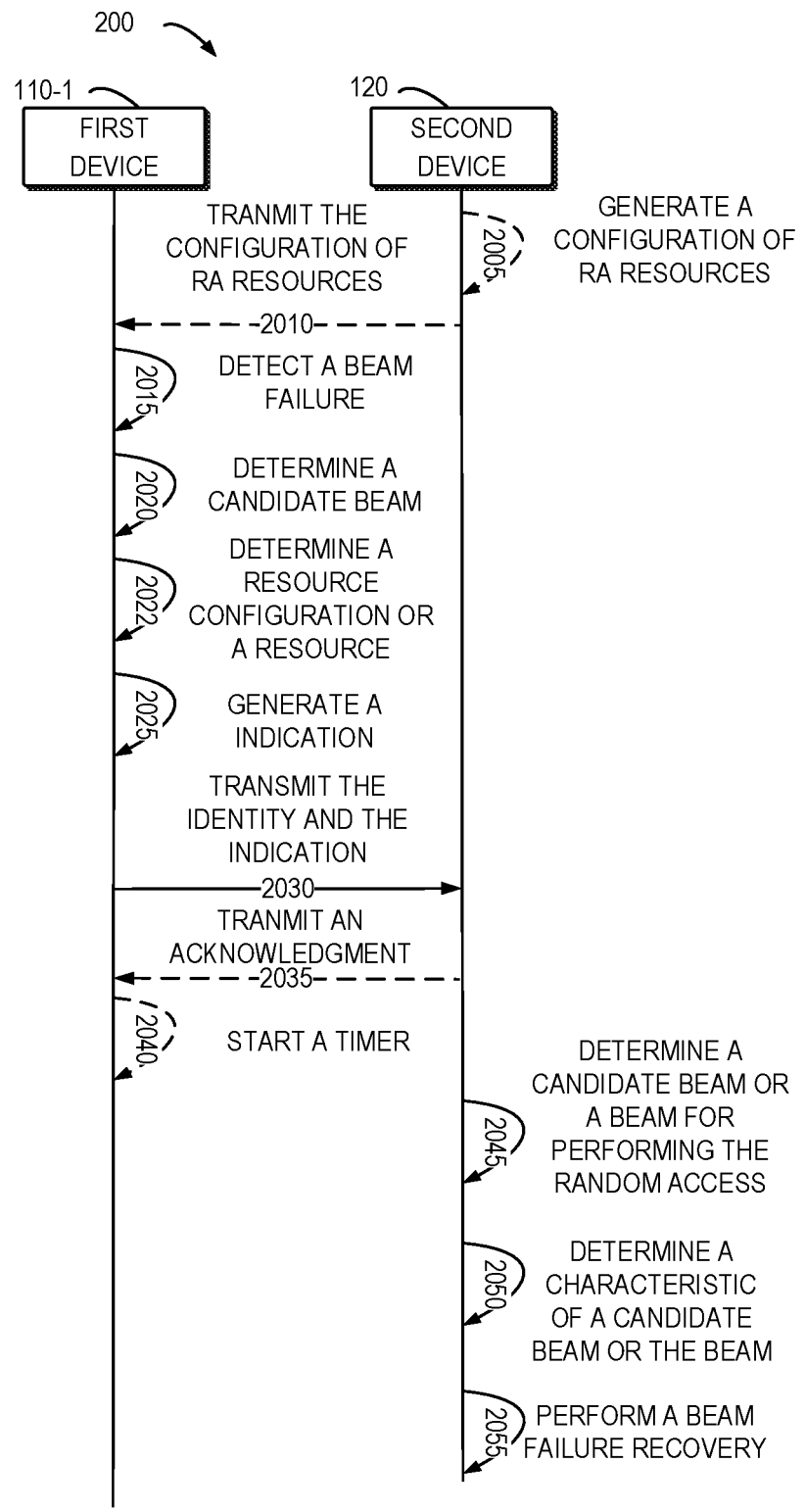
FIG. 2 illustrates a signaling flow for reporting candidate beams according to some embodiments of the present disclosure.

Example embodiments of the present disclosure will be described in detail below with reference to the accompanying drawings. Reference is now made to FIG. 2, which illustrates a signaling flow 200 of reporting candidate beams according to some example embodiments of the present disclosure. For the purpose of discussion, the process 200 will be described with reference to FIG. 1. The signaling flow 200 may involve the first device 110-1 and the second device 120.

In some example embodiments, the second device 120 may generate 2005 a resource configuration of RA. In some example embodiments, the resource configuration may indicate at least one resource for a CFRA procedure for beam failure recovery. For example, the second device 120 may allocate a list of beams for use in the CFRA based beam failure recovery. The resource configuration may also indicate one or more resources for a CFRA procedure for the list of beams. For example, the resource configuration may indicate a set of preambles for the CFRA procedure. Alternatively, or in addition, the resource configuration may indicate one or more resources for a CBRA procedure. For example, the second device 120 may also allocate one or more beams for use in the CBRA. The resource configuration may also indicate CBRA resources used for the random access. The second device 120 may transmit 2010 the configuration of RA resources to the first device 110-1.

The first device 110-1 may detect 2015 a beam failure in the serving cell 130-1. The serving cell 130-1 may be, e.g., a primary cell or a primary secondary cell. In some example embodiments, the first device 110-1 may detect the beam failure by determining the hypothetical PDCCH error rate (e.g. PDCCH block error rate, BLER) estimated on one or more beams. For example, if the PDCCH BLER (that may be determined by Signal-to-Interference-plus-Noise Ratio (SINR) estimated on the downlink RS corresponding to the beams used for PDCCH transmission for the terminal device) for the one or more beams is above a threshold (e.g. 10%), the first device 110-1 may determine that the beam failure or a beam failure instance occurs.

Upon detection of the beam failure, the first device 110-1 determines 2020 a candidate beam for beam failure recovery from a plurality of beams based on link qualities of the plurality of beams. For example, the first device 110-1 may measure a received power on the plurality of beams and select the candidate beam based on the measured received power such as RSRP or L1-RSRP. In some cases L1-SINR may be used. Only as an example, the first device 110-1 may select the candidate beam with the strongest received power. In some example embodiments, the plurality of beams may be the CFRA beams configured by the second device 120. In this situation, if one of the CFRA beams is above the first quality threshold, the first device 110-1 may select the CFRA beam to be the candidate beam. Similarly for CBRA, UE may select strongest (in terms of quality such as RSRPS) or select one of the beams above threshold.

In some example embodiments, if no candidate beam associated with the CFRA resources is available, the first device 110-1 may indicate (e.g., via an availability control (AC) field of a MAC CE) that no candidate was available and indicate a synchronization signal block (SSB) as a new candidate beam. In an embodiment, such SSB can be selected first among the SSBs above a configured RSRP threshold (e.g., rsrp-ThresholdSSB), or selected by UE implementation among all the SSBs if none of the SSBs are above the configured RSRP threshold. Alternatively, the first device 110-1 may indicate an index of a SSB which has a quality above threshold and corresponds to a non-failed SSB beam.

Generally, the first device 110-1 may select a candidate beam with a link quality exceeding a first threshold quality. In example embodiments, if the list of beams configured by the second device 120 and associated with the CFRA resources are available and no other beams have better link quality than the list of beams, the first device 110-1 may select the candidate beam from the list of beams. Alternatively, if one or more other beams have better link quality than the list of beams, the first device 110-1 may select the candidate beam from the one or more other beams.

Alternatively, the beams associated with the CFRA resource may have higher priority than other beams which are not associated with the CFRA. In such embodiments, the first device 110-1 may select, from the beams associated with the CFRA, one beam which is used for transmitting the message 1 (also referred to as Msg. 1) in the CFRA procedure. If a further beam which is not associated with the CFRA resource has a better link quality than the beam associated with the CFRA, the first device 110-1 may also select the further beam to be the candidate beam for use in the beam failure recovery. In some examples, the further beam to be selected as the candidate beam needs to be better than the one beam associated with the CFRA resource by an offset. Alternatively, a link quality of the further beam to be selected as the candidate beam needs to be above an absolute threshold. In another embodiment, when the link quality of the further beam is above an absolute threshold while the one beam associated with the CFRA resource has a link quality below another absolute threshold, the further beam is selected as the candidate beam.

To implement the beam failure recovery based on a random access procedure, the first device 110-1 determines 2022 a resource configuration for the random access procedure. As mentioned above, the resource configuration may be transmitted to the first device 110-1. The resource configuration may comprise a list of beams and each of the beams in the list may associate with a CFRA resource. Alternatively, the resource configuration may comprise one or more beams associated with the CBRA resource. In other embodiments, the resource configuration may indicate a CBRA resource to be used for the random access.

Alternatively, the first device 110-1 determines 2022 the resource to be used for the random access. For example, the first device 110-1 may determine a preamble for the random access. In example embodiment, if the first device 110-1 is configured with resources associated with CFRA, the first device 110-1 may first select the resource from the resources associated with the CFRA resource for the random access.

The first device 110-1 generates 2025 a characteristic indication for indicating a characteristic of the selected candidate beam or a characteristic of a beam for performing the random access. The characteristic indication may be generated based on at least one of the resource configuration or a resource used for performing the random access procedure. In example embodiments, if the resource configuration indicates the resources for the CBRA procedure, the characteristic indication may indicate whether the link quality of the candidate beam is above a first predetermined threshold quality. The first predetermined threshold quality may be the same as the threshold quality used for selecting a beam for RACH in the random access procedure. Alternatively, the first predetermined threshold quality may be different from the threshold quality used for selecting a beam for RACH in the random access procedure. In some example embodiments, if the selected candidate beam is a SSB beam, the first predetermined threshold quality may be the reference signal received power (RSRP)-Threshold SSB which is used for selecting the SSB and the corresponding preamble of the SSB. Alternatively, if the candidate beam is a channel state information reference signal (CSI-RS) beam, the first predetermined threshold quality may be the RSRP-Threshold CSI-RS which is used for selecting the CSI-RS and the corresponding preamble of the CSI-RS.

Alternatively, in example embodiments, if the resource configuration indicates the resources for the CFRA procedure or a CFRA is performed, the characteristic indication may indicate whether the candidate beam is associated with the CFRA resource. It should be understood that the characteristic used herein may be any suitable characteristics related to the BFR. In some embodiments, the characteristic indication may indicate the characteristic of the beam for the CFRA procedure.

In example embodiments, if the resource configuration indicates the resources for the random access or the resource is used for the random access the characteristic may indicate whether the link quality of the beam for performing the random access is above a second predetermined threshold quality. The second predetermined threshold quality may be the threshold quality used in the random access procedure. In example embodiments, if the beam for performing the random access is a SSB beam, the second predetermined threshold quality may be the RSRP-Threshold SSB. Alternatively, if the beam for performing the random access is a CSI-RS beam, the first predetermined threshold quality may be the RSRP-Threshold CSI-RS. The second predetermined threshold quality may be the same as the first predetermined threshold quality. It is to be understood that this is described for illustration rather than limitation. In other example embodiments of the present disclosure, the first predetermined threshold quality may be different from a second threshold quality.

The first device 110-1 transmits 2030 the identity and the characteristic indication to the second device 120. In this way, the second device 120 may be aware if the candidate beam indicated is actually the preferred beam, whether a link quality of the beam for RACH is good enough, or if there is stronger beam available. Further, the second device 120 may be aware if the candidate beam was above or below the configured threshold to make further decisions on the terminal device configuration within the given cell.

In example embodiments, the identity and the characteristic indication may be transmitted using a MAC CE. For example, the first device 110-1 may include an index of the candidate beam and the characteristic indication into the MAC CE. The MAC CE may also be called as BFR MAC CE. The SCell BFR MAC CE may be identified by a MAC subheader with logical channel ID (LCID).

In example embodiments, the MAC CE may have a variable size. It may include a bitmap and in ascending order based on the serving cell index, octets containing candidate beam availability indication for serving cell indicated in the bitmap. A single octet bitmap is used when the highest serving cell index of this MAC entity's serving cell configured with beam failure detection is less than a predetermined number, for example, 8. Otherwise, more octets are used, for example, four octets.

FIG. 3A illustrates a block diagram of an example BFR MAC CE 310 with beam failure detection (BFD) less than 8 and FIG. 3B illustrates a block diagram of an example BFR MAC CE 320 with BFD equal to or higher than 8.

As shown in the example of FIG. 3A, the BFR MAC CE 310 may comprise the AC field 3110, the R field 3120 (for example, 3120-1 and 3120-2), the Ci fields 3140 (for example, 3140-1, 3140-2, 3140-3, 3140-4, 3140-5, 3140-6 and 3140-7), and the beam index field 3130. As shown in the example of FIG. 3B, the BFR MAC CE 320 may comprise the AC field 3210, the R field 3220 (for example, 3220-1 and 3220-2), the Ci fields 3240 (for example, 3240-1, 3240-2, 3240-3, 3240-4, 3240-5, 3240-6, 3240-7, 3240-8, 3240-9, 3240-10, 3240-11, 3240-12, 3240-13, 3240-14, 3240-15, 3240-16, 3240-17, 3240-18, 3240-19, 3240-20, 3240-21, 3240-22, 3240-23, 3240-24, 3240-25, 3240-26, 3240-27, 3240-28, 3240-29, 3240-30, and 3240-31), and the beam index field 3230.

In some embodiments, the Ci field (shown as 3140 and 3240) indicates beam failure detection and the presence of an octet containing AC field for the serving cell with serving cell index i. If beam failure is detected for a serving cell with serving cell index i, the Ci field is set to 1, and the octet containing AC field is present for the serving cell with serving cell index i where i can be a suitable integer number. If beam failure is not detected for a serving cell with serving cell index i, the Ci field is set to 0, and octet containing AC field is not present for the serving cell with serving cell index i. The octets containing the AC field may be present in an ascending order based on the serving cell index.

The R fields (shown as 3120 and 3220) are used for reserved bits. The beam index field (shown as 3130 and 3230) may indicate an identity (index) of a candidate beam.

In some embodiments, the AC field (shown as 3110 and 3210) may comprise the characteristic indication for indicating a characteristic of the candidate beam or a characteristic of a beam used for random access. Only as an example, if the quality link of the candidate beam is above the first threshold quality, the AC field may be set to "1." If the quality link of the candidate beam is below the first threshold quality, the AC field may be set to "0." Alternatively, if the candidate beam is not associated with the CFRA, the AC field may be set to "0." If the candidate beam is associated with the CFRA, the AC field may be set to "1." Alternatively or additionally, another field may be encoded to indicate if the candidate beam is or is not associated with CFRA. In addition, in some example embodiments, the if the quality link of the beam for performing the random access is above the second threshold quality, the AC field may be set to "1." If the quality link of the beam for performing the random access is below the second threshold quality, the AC field may be set to "0." It should be noted that the above set values are only examples and not limitations.

In an alternative embodiment, when the first device 110-1 determines that the beam failure has occurred on at least one of the serving cell 130-1 (such as e.g. PCell, PsCell), the first device 110-1 may transmit the BFR MAC CE (or the SCell MAC CE) in specific manner or in specific format. In some examples, this may be referred as truncated format or truncated BFR MAC CE format for SpCell failure recovery. In one example, when the first device 110-1 determines that beam failure has occurred on SpCell, the first device 110-1 may indicate the SpCell failure using the bitmap and omit the candidate beam information. For example, the first device 110-1 may omit the candidate availability indication and candidate RS index fields and other fields in the same octet e.g. the R field. The candidate beam indicated by the first device 110-1 may be determined implicitly based on the indicated DL RS (SSB/CSI-RS) by the preamble during the CBRA procedure. The MAC CE may be transmitted in the Msg. 3 of the CBRA procedure, or it may be transmitted after or during the RACH procedure.

In one example, omitting the candidate beam indication may mean that the first device 110-1 transmits only Ci fields 3140 (including the indication for PCell failure that may be referred e.g. as serving cell index=0 or SpCell) of the MAC CE. In other words, as an example, when referring to FIG. 4A, the first device 110-1 may omit octet containing the AC field (AC field 3110) the R field (R field 3120-2) and the beam index (field 3130). The previous example may be applied for the MAC CE format for the FIG. 3B in similar manner as for FIG. 3A. In particular, the first device may omit octet containing the AC field (AC field 3210) the R field (R field 3220-2) and the beam index (field 3230).

In some embodiments, the first device 110-1 may use the truncated format when it performs CBRA on PCell to indicate at least PCell failure. In some cases, the first device 110-1 may only send the truncated MAC CE when only PCell is in failure and/or the first device 110-1 performs CBRA based beam failure recovery on serving cell (such as SpCell). In yet one further example, when the first device 110-1 indicates at least PCell failure using the MAC CE, the candidate information (octet containing AC, R and candidate RS index/beam index) associated with the PCell failure is omitted when the first device 110-1 performs the recovery signaling using the RACH procedure (CBRA/CFRA) on the SpCell. For other serving cell such as SCells that are in failure and indicated, the candidate beam information may be included in the MAC CE. In one example case, when the first device 110-1 sends the BFR MAC CE on UL grant on any serving cell, the first device 110-1 may include the candidate information for the PsCell (the octet with containing AC, R, candidate index).

It should be appreciated that the identity of the candidate beam and/or the characteristic indication for the candidate beam or the beam for random access may not necessarily be sent in the MAC CE described above. Instead, they can be sent to the network in any suitable message during any suitable procedure in either explicit or implicit way.

Referring back to FIG. 2, in some embodiments, when beam failure occurs in a serving cell, e.g., a primary cell, the first device 110-1 may transmit the identity and the characteristic indication to the second device 120 using an uplink channel in another serving cell, e.g., a secondary cell, for example 130-2. For example, the first device 110-1 may determine whether it has an uplink grant available on the secondary cell 130-2. If there is an uplink grant available on the secondary cell 130-2, a MAC CE including the identity and the characteristic indication may be transmitted on the uplink channel of the secondary cell 130-2, for example, a physical uplink shared channel. In some example embodiments, the first device 110-1 may initiate a random access procedure in the serving cell 130-1 before, during or after transmitting the MAC CE on the uplink channel of the secondary cell 130-2. In some embodiments, if the second device 120 transmits 2035 an acknowledgment to the identity and the characteristic indication from the second device 120, the first device 110-1 may cancel the random access procedure in the serving cell 130-1.

In some example embodiments, the first device 110-1 may start 2040 a timer after transmitting the identity and the characteristic indication such that the random access procedure can be delayed. For example, if the first device 110-1 does not receive a reconfiguration for the link with the serving cell 130-1 before the timer expires, the first device 110-1 may initiate the random access procedure. Alternatively, or in addition, if the first device 110-1 receives the reconfiguration before the expiration of the timer, the first device 110-1 may not initiate the random access procedure. Alternatively, or in addition, if the first device 110-1 receives an acknowledgement from the second device 120 for the transmission of the identity and the characteristic indication before the expiration of the timer, the first device 110-1 may not initiate the random access procedure. In this way, BFR can be completed for serving cell without/with cancelling RA procedure in case the MAC CE can complete it over a SCell.

Alternatively, the first device 110-1 may transmit the identity and the characteristic indication during a random access procedure to the serving cell 130-1. For example, if the candidate beam is associated with the CBRA procedure, the first device 110-1 may determine a preamble related to the candidate beam. The first device 110-1 may transmit the preamble (i.e., Msg. 1) to the second device 120. After receiving the random access response (i.e., message2, also referred to as Msg. 2) to the preamble, the first device 110-1 may transmit the identity and the characteristic indication in the Msg. 3. In other embodiments, the first device 110-1 may only transmit the characteristic indication in the Msg. 3 while the identity can be known from the preamble.

In other embodiments, the first device 110-1 may use a preamble related to a different beam than that indicated in the Msg. 3. In some embodiments, the characteristic indication indicates a characteristic of the beam associated with the preamble, while in some other embodiments, the characteristic indication may indicate a characteristic of the candidate beam indicate in the message. In some embodiments, the first device 110-1 may transmit the identity and the characteristic indication in the MSGA of 2-step random access procedure.

In some example embodiments, the first device 110-1 may determine whether the beam associated with the CFRA procedure is available. For example, if the link quality of the beam associated with the CFRA procedure is above a predetermined threshold quality, the beams associated with the CFRA procedure is available. Alternatively, if the beam associated with the CFRA procedure is not occupied, the first device 110-1 may determine the beam associated with the CFRA to be available. If the beam associated with the CFRA procedure is available, the first device 110-1 may determine a preamble related to the beam associated with the CFRA procedure. The first device 110-1 may transmit the preamble (i.e., Msg. 1) to the second device 120. After receiving the random access response (i.e., Msg. 2) to the preamble, the first device 110-1 may transmit both the identity and the characteristic indication or the characteristic indication only in the message 3. The beam associated with the CFRA procedure may be the same as the candidate beam. Alternatively, the beam associated with the CFRA procedure may be different from the candidate beam. The first device 110-1 may generate another indication to explicitly indicate that whether the beam associated with the CFRA procedure is different from the candidate beam. Alternatively, the first device 110-1 may generate the characteristic indication to indicate a link quality of the candidate beam or the beam associated with the preamble, e.g., whether the link quality of the candidate beam or the beam associated with the preamble is above a predetermined threshold.

The second device 120 may determine whether the beam associated with the CFRA is different from the candidate beam based on the characteristic indication, or alternative based on the preamble in message 1 and the identity in the BFR MAC CE. For example, if the beam associated with the CFRA is different from the candidate beam, the second device 120 may assume that the index of the candidate beam to be an SSB index.

The second device 120 determines 2045 the candidate beam based on the identity. For example, the second device 120 may obtain the identity from the beam index field (shown as 3130 and 3230). Alternatively, the second device 120 determines 2045 the beam for performing the random access for the BFR. For example, if the second device 120 receives a preamble for the random access procedure, the second device 120 may determine the beam based on the preamble.

The second device 120 determines 2045 the candidate beam based on the received identity. For example, the second device 120 may obtain the index of the candidate beam from the beam index field (shown as 3130 and 3230). Alternatively or in addition, in some embodiments, the second device 120 may determine the beam for performing the random access for the BFR. For example, if the second device 120 receives a preamble for the random access procedure, the second device 120 may determine the beam based on the preamble.

The second device 120 determines 2050 a characteristic of the candidate beam or the characteristic of the beam for random access based on the received characteristic indication and at least one of: a resource configuration for a random access for the beam failure recovery or a resource used for performing the random access. For example, the resource configuration may indicate the resources for the CFRA. In this case, in some embodiments, the second device 120 may determine if the candidate beam is associated with the CFRA procedure based on the characteristic indication. For example, the second device 120 may determine whether the beam used for the CFRA procedure is different from the candidate beam based on the characteristic indication. If the characteristic indication indicates that the candidate beam is not associated with the CFRA procedure, the second device 120 may determines that that beam used for the CFRA procedure is different from the candidate beam, which means that the candidate beam has a better link quality. In some embodiments, if the beam associated with the CFRA is different from the candidate beam, the second device 120 may assume that the index of the candidate beam to be an SSB index.

In some example embodiments, the resource configuration for the first device 110-1 may indicate the resources for the CBRA. Alternatively, the CBRA resource may be used by the first device 110-1 for the random access. In this case, in some embodiments, the second device 120 may determine whether the link quality of the candidate beam or the beam for the CBRA exceeds the first threshold quality, based on the characteristic indication received from the first device. The characteristic indication may explicitly indicate whether the link quality of the candidate beam (or alternatively the beam for CBRA) is above the first threshold quality. The first threshold quality may be the same as the threshold quality in the random access procedure. Alternatively, the first threshold quality and the threshold quality in the random access procedure may be different.

Alternatively, in some embodiments, the resource configuration may indicate a resource for the random access, or the resource may be used by the first device for the random access. In this case, the second device 120 may determine whether the link quality of the beam for performing the random access exceeds the second threshold quality based on the characteristic indication received from the first device. In some embodiments, the characteristic indication may explicitly indicate whether the link quality of the beam for performing the random access is above the second threshold quality. The second threshold quality may be the same as the threshold quality in the random access procedure. Alternatively, the second threshold quality and the threshold quality in the random access procedure may be different. The first and second predetermined threshold quality may be the same. Alternatively, the first predetermined threshold quality may be different from the second threshold quality.

The second device 120 performs 2055 the beam failure recovery based on the candidate beam and the characteristic. For example, if the characteristic of the candidate beam indicates a link quality above a threshold or indicates the candidate beam as a stronger beam than that used in the random access, the second device 120 may switch its beam to the candidate beam and transmit a response on the candidate beam. Alternatively, in some embodiments, if the link quality of the candidate beam is indicated as below the first threshold quality, the second device 120 may recover from the failure using a beam different from the candidate beam. In some embodiments, if characteristic of the beam for the random access procedure is indicated, the second device 120 may perform the beam failure recovery using the beam used for the random access procedure. In an example embodiment, if the link quality of the beam used for the random access procedure is better than the candidate beam, the second device 120 may perform the beam failure recover with the beam used for the random access procedure. Alternatively, if the link quality of the beam used for the random access procedure is similar to the candidate beam, the second device 120 may select one beam between the beam used for the random access procedure and the candidate beam and may perform the beam failure recover with the selected beam.

Figure 4:
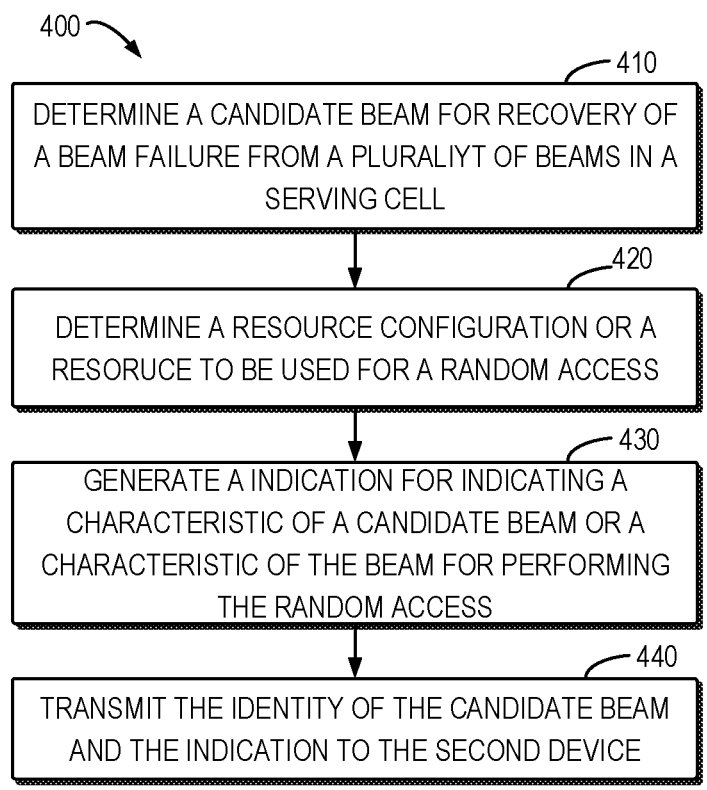
FIG. 4 illustrates a flowchart of a method implemented at a first apparatus according to some example embodiments of the present disclosure.

FIG. 4 shows a flowchart of an example method 400 implemented at a first device 110 in accordance with some example embodiments of the present disclosure. For the purpose of discussion, the method 400 will be described from the perspective of the first device 110-1.

In example embodiments, the first device 110-1 may receive a configuration of RA resources from the second device 120. In example embodiments, the resource configuration may indicate one or more resources for the CFRA procedure. For example, the second device 120 may allocate a list of beams which is used for the CFRA recovery. In some embodiments, the resource configuration may indicate CFRA resources used for the random access. Alternatively, or in addition, the resource configuration may indicate resources for the CBRA procedure. For example, the second device 120 may also allocate one or more beams used for the CBRA based beam failure recovery.

The first device 110-1 may detect a beam failure in the serving cell 130-1. In some example embodiments, the first device 110-1 may detect the beam failure by determining the power of signals received on the least one beam. For example, if the layer 1 reference signal received power (L1-RSRP) for the least one beam is below a threshold power, the first device 110-1 may determine that beam failure occurs.

At block 410, if the beam failure occurs in the serving cell 130-1, the first device 110-1 determines a candidate beam for the beam failure recovery from a plurality of beams in the serving cell 130-1 based on the link qualities of the plurality of beams. For example, the first device 110-1 may measure the received power on the plurality of beams and select the candidate beam based on the measured received power.

In some embodiments, the plurality of beams may include beams for CFRA for BFR. In some embodiments, the plurality of beams may include beams for CBRA. In some embodiments, the plurality of beams may further include beams (e.g., SSB beams) not associated with CFRA. In some embodiments, if no candidate beam with configured CFRA resources is available, the first device 110-1 may indicate (e.g., via setting a specific value to the AC field) that no candidate is available, and indicate a new SSB candidate RS. Such SSB can be selected first from SSBs above a configured RSRP threshold, or selected by UE implementation from all SSBs if none of the SSBs are above the configured RSRP threshold. Alternatively, the first device 110-1 may indicate an index of one SSB, which has a SS-RSRP above threshold and corresponds to a non-failed SSB, as the candidate beam.

In some example embodiments, if the list of beams associated with the CFRA are available and no other beams have better link quality than the list of beams, the first device 110-1 may select the candidate beam from the list of beams. Alternatively, if there are one or more beams having better link quality than the list of beams, the first device 110-1 may select the candidate beam from the one or more beams.

Alternatively, the beams associated with the CFRA may have higher priority than other beams not associated with the CFRA. In such situation, the first device 110-1 may select one beam from the beams associated with the CFRA which is used for transmitting the message 1 in the CFRA procedure. If a further beam unassociated with the CFRA has a better link quality than then beam associated with the CFRA, the first device 110-1 may also select the further beam to be the candidate beam which is used for the beam failure recovery.

The first device 110-1 may indicate the index of the selected candidate beam via random access preamble and/or other message.

At block 420, the first device 110-1 determines the resource configuration for random access for the beam failure recovery. As discussed above, the resource configuration may be received by the first device 110-1 from the network device 120. The resource configuration may comprise a list of beams and each of the beams in the list may associate with a CFRA resource. Alternatively, the resource configuration may comprise information on CBRA resources, and/or one or more beams associated with the CBRA resource.

Alternatively or in addition, the first device 110-1 may determine the resource to be used for a random access. For example, the first device 110-1 may determine a preamble for the random access. In example embodiment, if the first device 110-1 is configured with resources associated with CFRA, the first device 110-1 may first select the resource from the resources associated with the CFRA for the random access.

At block 430, the first device 110-1 generates a characteristic indication for indicating a characteristic of the selected candidate beam or a characteristic of a beam for performing the random access. The generation of the characteristic indication may be based on at least one of: the resource configuration, or a resource used for performing the random access. In some example embodiments, if the resource configuration indicates resources for the CBRA procedure, the characteristic indication may indicate whether the link quality of the candidate beam is above a first predetermined threshold quality.

The first predetermined threshold quality may be set in a variety of ways. For example, it may be the same as the threshold quality used in the random access procedure. Alternatively, the first predetermined threshold quality may be different from the threshold quality used in the random access procedure. In some example embodiments, if the candidate beam is a SSB beam, the first predetermined threshold quality may be the RSRP-Threshold SSB. Alternatively, if the candidate beam is a CSI-RS beam, the first predetermined threshold quality may be the RSRP-Threshold CSI-RS.

Alternatively, in some example embodiments, if the resource configuration indicates resources for the CFRA procedure, the characteristic indication may indicate whether the selected candidate beam is associated with the CFRA procedure. It should be noted that the characteristic of a beam used herein may be any suitable characteristics related to the BFR.

In example embodiments, if the resource configuration indicates the resources for the random access, the characteristic indication may indicate whether the link quality of the beam for performing the random access is above a second predetermined threshold quality. The second predetermined threshold quality may be the threshold quality used in the random access procedure. In example embodiments, if the beam for performing the random access is a SSB beam, the second predetermined threshold quality may be the RSRP-Threshold SSB. Alternatively, if the beam for performing the random access is a CSI-RS beam, the first predetermined threshold quality may be the RSRP-Threshold CSI-RS.

At block 440, the first device 110-1 transmits the identity and the characteristic indication to the second device 120. In this way, the second device 120 may be aware if the candidate beam indicated is actually the preferred beam, whether a link quality of the beam used for random access is good enough, or if a beam stronger than the beam for random access is available. Further, the second device may be aware if the candidate beam was above or below the configured threshold to make further decisions on the terminal device configuration within the given cell.

In some embodiments, the characteristic indication generated by the first device 110-1 may be sent together with the index of the selected candidate beam to the second device. In some embodiments, the characteristic indication and the index of the candidate beam may be sent separately.

In some example embodiments, the identity and the characteristic indication may be transmitted using a MAC CE. Alternatively or in addition, in some embodiments, the first device 110-1 may transmit the identity and the characteristic indication to the second device 120 using an uplink channel in another serving cell, e.g., a secondary cell, for example 130-2. For example, the first device 110-1 may determine whether it has an uplink grant available on the cell 130-2 which is the other serving cell. If there is an uplink grant available on the cell 130-2, the MAC CE including the identity and the characteristic indication may be transmitted on the uplink channel, for example a physical uplink shared channel, of the cell 130-2.

In some example embodiments, the first device 110-1 may initiate a random access procedure for BFR in the serving cell 130-1, before/during/after transmitting the MAC CE on the uplink channel of the secondary cell 130-2.

In some embodiments, if the second device 120 transmits an acknowledgment to the identity and the characteristic indication from the second device 120, the first device 110-1 may cancel the random access procedure in the serving cell 130-1.

In some example embodiments, the first device 110-1 may start a timer after transmitting the identity and the characteristic indication such that the random access procedure can be delayed. For example, if the first device 110-1 does not receive a reconfiguration for the link with the serving cell 130-1 before the timer expires, the first device 110-1 may initiate the random access procedure. Alternatively, or in addition, if the first device 110-1 receives the reconfiguration before the expiration of the timer, the first device 110-1 may not initiate the random access procedure. In this way, BFR can be completed for SpCell without/with cancelling RA procedure in case the MAC CE can complete it over a SCell.

Alternatively, the first device 110-1 may transmit the identity and the characteristic indication in the random access procedure. For example, if the candidate beam is associated with the CBRA procedure, the first device 110-1 may determine a preamble related to the candidate beam. The first device 110-1 may transmit the preamble (i.e., message 1) to the second device 120. After receiving the random access response (i.e., message 2) to the preamble, the first device 110-1 may transmit both the identity and the characteristic indication or the characteristic indication only in the message 3. In some embodiments, the first device 110-1 may use a preamble related to a different beam than that indicted in the Message 3.

In some example embodiments, the first device 110-1 may determine whether the beam associated with the CFRA procedure is available. If the beam associated with the CFRA procedure is available, the first device 110-1 may determine a preamble related to the beam associated with the CFRA procedure. The first device 110-1 may transmit the preamble (i.e., Msg. 1) to the second device 120. After receiving the random access response (i.e., Msg. 2) to the preamble, the first device 110-1 may transmit the identity and the characteristic indication in the Msg. 3. The beam associated with the CFRA procedure may be the same as the candidate beam. Alternatively, in some embodiments, the beam associated with the CFRA procedure may be different from the candidate beam indicated in a message. The first device 110-1 may generate a characteristic indication to explicitly indicate that the beam associated with the CFRA procedure is different from the candidate beam. Alternatively, the second device 120 may determine whether the beam associated with the CFRA is different from the candidate beam based on the preamble in message 1 and the identity of the candidate beam in a message (e.g., a BFR MAC CE) in a RACH procedure or other procedure.

Figure 5:
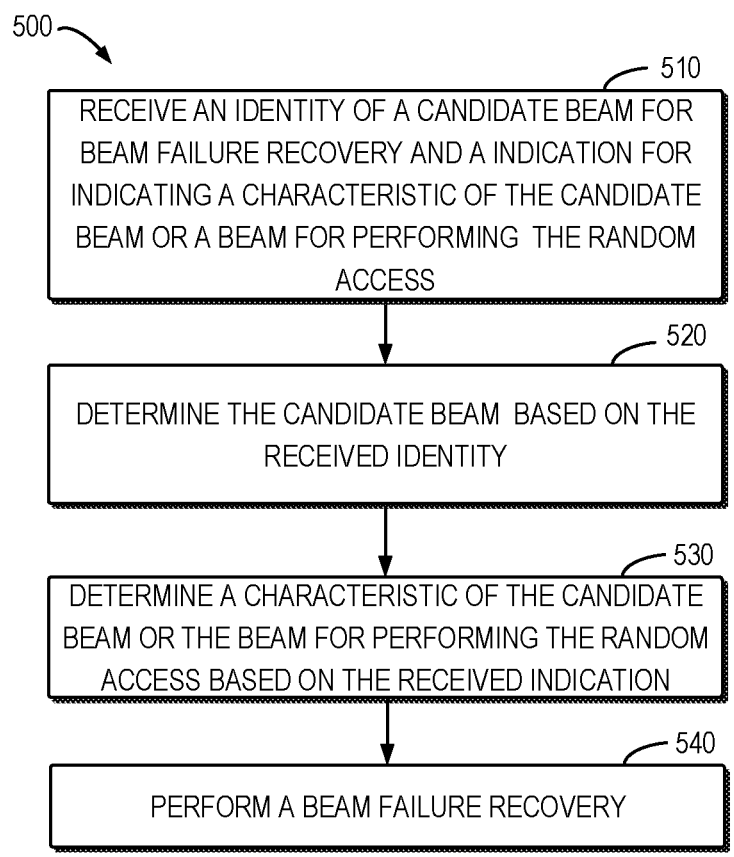
FIG. 5 illustrates a flowchart of a method implemented at a second apparatus according to some other example embodiments of the present disclosure.

FIG. 5 shows a flowchart of an example method 500 implemented at a second device 120 in accordance with some example embodiments of the present disclosure. For the purpose of discussion, the method 500 will be described from the perspective of the second device 120.

In some example embodiments, the second device 120 may generate the configuration of RA resources. For example, the second device 120 may allocate a list of beams which is used for the CFRA based beam failure recovery. Alternatively, or in addition, the second device 120 may also allocate one or more beams used for the CBRA based beam failure recovery. The second device 120 may transmits the configuration of RA resources to the first device 110-1.

At block 510, the second device 120 receives the identity of the candidate beam for the beam failure recover and the characteristic indication for indicating a characteristic of the candidate beam or a characteristic of a beam for random access. In some example embodiments, the second device 120 may receive the identity and the characteristic indication in a MAC CE. For example, the identity and the characteristic indication may be received in the MAC CE on an uplink channel of a cell 130-2. Alternatively, the second device 120 may receive the identity and the characteristic indication during the random access procedure, for example, in message 3. Note that the identity and the characteristic indication may be received in separate messages. From the received information, the second device 120 may be aware if the candidate beam indicated is actually the preferred beam or if there is stronger beam available. In an example embodiment, the second device 120 may transmit an acknowledgement to the first device 110-1.

In some example embodiments, the second device 120 may receive a preamble for the random access from the first device 110-1. The second device 120 may generate the random access response to the preamble. For example, the second device 120 may generate the uplink grant and transmission configuration for the message 3.

At block 520, the second device 120 determines the candidate beam based on the identity. For example, the second device 120 may obtain the identity from the beam index field (shown as 3130 and 3230). In some embodiments, the second device 120 may determine the candidate beam based on the preamble used for random access. Alternatively, the second device 120 may determine the beam for performing the random access for the BFR. For example, if the second device 120 receives a preamble for the random access procedure, the second device 120 may determine the beam based on the preamble.

At block 530, the second device 120 determines a characteristic of the candidate beam or the characteristic of the beam for random access based on the received characteristic indication and at least one of: a resource configuration for a random access for the beam failure recovery or a resource used for performing the random access. In some embodiments, the second device 120 may determine a characteristic of the beam used for random access, based on the received characteristic indication and at least one of: a resource configuration for the random access for the beam failure recovery or a resource used for performing the random access.

For example, the resource configuration may indicate the resources for the CFRA. In this case, in some embodiments, the second device 120 may determine whether the selected candidate beam is associated with the CFRA procedure based on the characteristic indication. For example, the second device 120 may determine whether the beam used for the CFRA procedure is different from the candidate beam based on the characteristic indication. If the characteristic indication indicates that the candidate beam is not associated with the CFRA procedure, the second device 120 may determines that that beam used for the CFRA procedure is different from the candidate beam, which means that the candidate beam has a better link quality. In some embodiments, if the beam associated with the CFRA is different from the candidate beam, the second device 120 may assume that the index of the candidate beam to be an SSB index.

In some example embodiments, the resource configuration for the first device 110-1 may indicate the resources for the CBRA. Alternatively, the CBRA resource may be used by the first device 110-1 for the random access. In this case, in some embodiments, the second device 120 may determine whether the link quality of the candidate beam or the beam for the CBRA exceeds the first threshold quality based on the characteristic indication received from the first device. The characteristic indication may explicitly indicate whether the link quality of the candidate beam (or alternatively the beam for CBRA) is above the first threshold quality. The first threshold quality may be the same as the threshold quality in the random access procedure. Alternatively, the first threshold quality and the threshold quality in the random access procedure may be different.

Alternatively, in some embodiments, the resource configuration may indicate a resource for the random access, or the resource may be used by the first device for the random access. In this case, the second device 120 may determine whether the link quality of the beam for performing the random access exceeds the second threshold quality based on the characteristic indication received from the first device. In some embodiments, the characteristic indication may explicitly indicate whether the link quality of the beam for performing the random access is above the second threshold quality. The second threshold quality may be the same as the threshold quality in the random access procedure. Alternatively, the second threshold quality and the threshold quality in the random access procedure may be different. The first and second predetermined threshold quality may be the same. Alternatively, the first predetermined threshold quality may be different from the second threshold quality.

At block 540, the second device 120 performs the beam failure recovery based on the candidate beam and the characteristic. For example, if the characteristic of the candidate beam indicates a link quality of the candidate beam above a threshold or indicates the candidate beam as a stronger beam than that used in the random access, the second device 120 may switch its beam to the candidate beam. In some embodiments, the second device 120 may transmit a response on the candidate beam. In this way, the second device 120 may be aware if the candidate beam was above or below the configured threshold to make further decisions on the terminal device configuration within the given cell.

In some example embodiments, a first apparatus capable of performing any of the method 400 (for example, the first device 110) may comprise means for performing the respective operations of the method 400. The means may be implemented in any suitable form. For example, the means may be implemented in a circuitry or software module. The first apparatus may be implemented as or included in the first device 110. In some embodiments, the means may comprise at least one processor and at least one memory including computer program code. The at least one memory and computer program code are configured to, with the at least one processor, cause performance of the apparatus.

In some example embodiments, the first apparatus comprises means for: in accordance with a determination that a beam failure occurs in a serving cell, determining a candidate beam for beam failure recovery from a plurality of beams in the serving cell based on link qualities of the plurality of beams; determining a resource configuration for a random access for the beam failure recovery for the first device or a resource to be used for the random access; generating a characteristic indication for indicating a characteristic of the selected candidate beam or a characteristic of a beam for performing the random access, based on at least one of the determined resource configuration or the determined resource; and transmitting an identity of the candidate beam and the characteristic indication to a second device.

In some example embodiments, the means for generating the characteristic indication comprises means for generating the characteristic indication for indicating whether the link quality of the selected candidate beam exceeds a first predetermined threshold quality, if the resource configuration indicates at least one resource for a contention based random access procedure or a contention based random access resource is used for the random access. In some embodiments, the means for generating the characteristic indication comprises means for generating the characteristic indication for indicating whether the link quality of the beam for performing the random access exceeds a second predetermined threshold quality, if the resource configuration indicates a resource for the random access or the resource is used for the random access. In some embodiments, the means for generating the characteristic indication comprises means for generating the characteristic indication for indicating whether the selected candidate beam is associated with a contention free random access procedure, if the resource configuration indicates at least one resource for the contention free random access procedure or a contention free random access resource is used for the random access.

In some example embodiments, the first apparatus may further comprise means for cancelling a random access procedure for beam failure recovery in progress in the serving cell in response to receiving an acknowledgment to the transmission of the identity of the candidate beam and the characteristic indication.

In some example embodiments, the first apparatus may further comprise means for: starting a timer after the transmission of the identity of the candidate beam and the characteristic indication; and delaying a random access procedure for beam failure recovery until that the first device fails to receive a reconfiguration for a link with the serving cell before the timer expires.

In some example embodiments, the means for transmitting the identity of the candidate beam and the characteristic indication to the second device may comprise means for transmitting, to the second device, the identity of the candidate beam and the characteristic indication in an uplink channel of another serving cell. For example, when beam failure occurs in a Spcell, the first apparatus may comprise means for transmitting the identity of the candidate beam and the characteristic indication in an uplink channel of a secondary cell. Alternatively, in some example embodiments, the means for transmitting the identity of the candidate beam and the characteristic indication may comprise means for transmitting, to the second device, the identity of the candidate beam and the characteristic indication during a random access procedure to the serving cell.

In some example embodiments, the means for determining the candidate beam may comprise: means for receiving the resource configuration indicating a list of beams each associated with a contention free random access resource; means for in response to a beam, which is not associated with the contention free random access resources and has a better link quality than the list of beams, being available, selecting the beam as the candidate beam. In some example embodiments, the means for determining the candidate beam may comprise means for selecting the candidate beam from the list of beams based on link qualities of the list of beams if a beam, which is not associated with the contention free random access resources and has a better link quality than the list of beams, is unavailable, In some example embodiments, the identity of the candidate beam and the characteristic indication is transmitted in a medium access control control element.

In example embodiments, the serving cell is a primary cell or a primary secondary cell.

In some example embodiments, a second apparatus capable of performing any of the method 500 (for example, the second device 120) may comprise means for performing the respective operations of the method 500. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the apparatus. The first apparatus may be implemented as or included in the second device 120.

In some example embodiments, the second apparatus comprises means for: receiving, from a first device, an identity of a candidate beam for beam failure recovery and an characteristic indication for indicating a characteristic of the candidate beam or a beam for performing a random access for beam failure recovery; determining the candidate beam based on the received identity; determining the characteristic of the candidate beam or the characteristic of the beam for performing the random access based on the received characteristic indication and at least one of: a resource configuration for the random access or a resource used for performing the random access; and performing the beam failure recovery based on the candidate beam and the characteristic.

In some example embodiments, the means for determining the characteristic comprises means for determining whether the link quality of the candidate beam exceeds a predetermined threshold quality based on the characteristic indication, if a resource configuration for a contention based random access procedure is configured for the first device or a contention based random access resource is used for the random access by the first device. In some example embodiments, the means for determining the characteristic comprises means for determining whether the link quality of the beam for performing the random access exceeding a second predetermined threshold quality based on the characteristic indication, if a resource for a random access for beam failure recovery is configured for the first device or a resource is used for performing the random access by the first device. In some example embodiments, the means for determining the characteristic comprises means for determining whether the candidate beam is associated with a contention free random access procedure based on the characteristic indication, if a resources configuration for a contention free random access procedure is configured for the first device or a contention free random access resource is used for the random access by the first device.

In some example embodiments, the second apparatus further comprises means for transmitting, to the first device, an acknowledgment to the identity and the characteristic indication.

In some example embodiments, the second apparatus further comprises means for transmitting a resource configuration indicating a list of beams each associated with a random access resource.

In example embodiments, the serving cell is a primary cell or a primary secondary cell.

In some example embodiments, the means for receiving the identity of the candidate beam and the characteristic indication comprises means for receiving the identity and the characteristic indication in a medium access control control element.

In some example embodiments, the means for receiving the identity of the candidate beam and the characteristic indication comprises means for receiving, from the first device, the identity of the candidate beam and the characteristic indication in an uplink channel of another serving cell, e.g., a secondary cell. In some example embodiments, the means for receiving the identity of the candidate beam and the characteristic indication comprises means for receiving, from the first device, the identity of the candidate beam and the characteristic indication during a random access procedure to the serving cell. Note that the identity of the candidate beam and the characteristic indication may be received via separate messages.

Figure 6:
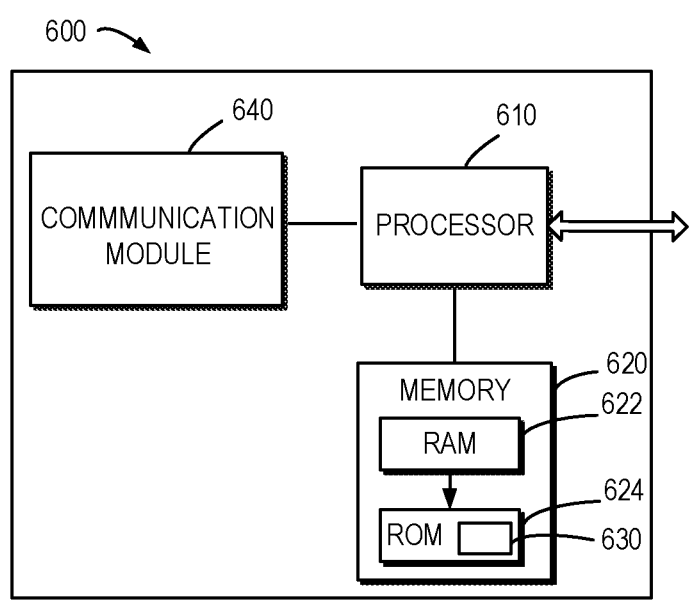
FIG. 6 illustrates a simplified block diagram of an apparatus that is suitable for implementing example embodiments of the present disclosure.

FIG. 6 is a simplified block diagram of a device 600 that is suitable for implementing example embodiments of the present disclosure. The device 600 may be provided to implement a communication device, for example, the first device 110 or the second device 120 as shown in FIG. 1. As shown, the device 600 includes one or more processors 610, one or more memories 620 coupled to the processor 610, and one or more communication modules 840 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the memory, e.g., ROM 624. The processor 610 may perform any suitable actions and processing by loading the program 630 into the RAM 622.

The some example embodiments of the present disclosure may be implemented by means of the program 630 so that the device 600 may perform any process of the disclosure as discussed with reference to FIGS. 2 to 5. The example embodiments of the present disclosure may also be implemented by hardware or by a combination of software and hardware.

Figure 7:
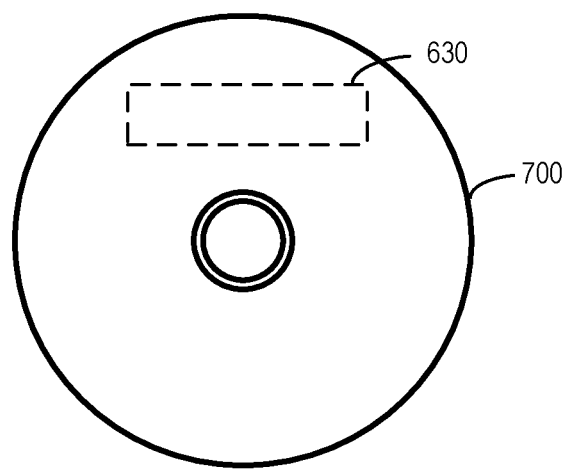
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and other magnetic storage and/or optical storage. FIG. 7 shows an example of the computer readable medium 700 in form of an optical storage disk. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 2 to 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
   at least one processor; and
   at least one memory including computer program codes;
   the at least one memory and the computer program codes are configured to, with the at least one processor, cause the first device to:
   in accordance with a determination that a beam failure occurs in a special cell, initiate a contention-based random access procedure for beam failure recovery of the special cell;
   indicate by the first device a candidate beam for beam failure recovery of the special cell to a second device via a preamble during the contention-based random access procedure;
   include an indication for indicating the beam failure for the special cell into a media access control (MAC) control element (CE); and
   transmit the MAC CE to the second device via a Msg. 3 during the contention-based random access procedure;
   wherein the special cell comprises a primary cell or a primary secondary cell, and wherein the MAC CE omits information related to the candidate beam for beam failure recovery of the special cell.

2. The first device of claim 1, where the MAC CE includes a bitmap indicating beam failure detection for the special cell and at least one secondary cell.

3. The first device of claim 1, wherein the MAC CE includes a field indicating candidate beam related information for at least one secondary cell.

4. The first device of claim 1, wherein the omitted information related to the candidate beam comprises a candidate availability indication and a candidate reference signal index for the special cell.

5. A method for communication, comprising:
   in accordance with a determination that a beam failure occurs in a special cell, initiating, by a first device, a contention-based random access procedure for beam failure recovery of the special cell;
   indicate by the first device a candidate beam for beam failure recovery of the special cell to a second device via a preamble during the contention-based random access procedure;
   including, by the first device, an indication for indicating the beam failure for the special cell into a media access control (MAC) control element (CE); and
   transmitting, by the first device, the MAC CE to the second device via a Msg. 3 during the contention-based random access procedure;
   wherein the special cell comprises a primary cell or a primary secondary cell, and wherein the MAC CE omits information related to the candidate beam for beam failure recovery of the special cell.

6. The method of claim 5, where the MAC CE includes a bitmap indicating beam failure detection for the special cell and at least one secondary cell.

7. The method of claim 5, wherein the MAC CE includes a field indicating candidate beam related information for at least one secondary cell.

8. The method of claim 5, wherein the omitted information related to the candidate beam comprises a candidate availability indication and a candidate reference signal index for the special cell.

9. A non-transitory computer readable medium comprising program instructions for causing a first device to:
   in accordance with a determination that a beam failure occurs in a special cell, initiate a contention-based random access procedure for beam failure recovery of the special cell;
   indicate by the first device a candidate beam for beam failure recovery of the special cell to a second device via a preamble during the contention-based random access procedure;
   include an indication for indicating the beam failure for the special cell into a media access control (MAC) control element (CE); and
   transmit the MAC CE to the second device via a Msg. 3 during the contention-based random access procedure;
   wherein the special cell comprises a primary cell or a primary secondary cell, and wherein the MAC CE omits information related to the candidate beam for beam failure recovery of the special cell.

10. The non-transitory computer readable medium of claim 9, where the MAC CE includes a bitmap indicating beam failure detection for the special cell and at least one secondary cell.

11. The non-transitory computer readable medium of claim 1, wherein the MAC CE includes a field indicating candidate beam related information for at least one secondary cell.

12. The non-transitory computer readable medium of claim 9, wherein the omitted information related to the candidate beam comprises a candidate availability indication and a candidate reference signal index for the special cell.

* * * * *